US011512966B2

(12) United States Patent
Nakano et al.

(10) Patent No.: US 11,512,966 B2
(45) Date of Patent: Nov. 29, 2022

(54) INFORMATION PROCESSING APPARATUS, CONTROL METHOD AND NON-TRANSITORY COMPUTER-READABLE MEDIUM

(71) Applicant: TOYOTA JIDOSHA KABUSHIKI KAISHA, Toyota (JP)

(72) Inventors: Keiko Nakano, Kawasaki (JP); Yu Nagata, Nagoya (JP); Takashi Hayashi, Aichi-gun (JP); Ryota Kondo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 332 days.

(21) Appl. No.: 16/945,231

(22) Filed: Jul. 31, 2020

(65) Prior Publication Data

US 2021/0033407 A1  Feb. 4, 2021

(30) Foreign Application Priority Data

Jul. 31, 2019  (JP) ............................ JP2019-141641

(51) Int. Cl.
*G01C 21/34* (2006.01)
*H04N 7/18* (2006.01)
*G06Q 50/30* (2012.01)

(52) U.S. Cl.
CPC ......... *G01C 21/3407* (2013.01); *G06Q 50/30* (2013.01); *H04N 7/188* (2013.01)

(58) Field of Classification Search
CPC .............. G01C 21/3407; G06Q 50/30; G06Q 10/06311; H04N 7/188; H04N 4/024; H04N 4/40; H04N 4/44; G08G 1/123; G08G 1/0968
See application file for complete search history.

(56) References Cited

U.S. PATENT DOCUMENTS

2003/0187720 A1  10/2003  Takada
2017/0229045 A1  8/2017  Mukaiyama et al.
2019/0051171 A1*  2/2019  Malkes ................ G08G 1/08

FOREIGN PATENT DOCUMENTS

CN  107076563 A  8/2017
JP  2003-288687 A  10/2003
JP  2005257342 A *  9/2005

* cited by examiner

*Primary Examiner* — Marthe Y Marc-Coleman
(74) *Attorney, Agent, or Firm* — Oliff PLC (57) ABSTRACT

An information processing apparatus, a control method, and a program which improve usability of techniques for generating a travel plan for a vehicle are provided. The information processing apparatus such as a server includes a controller. In a case in which information on a departure place is accepted, the controller selects at least one destination from one or more destination candidates and generates a travel plan for a vehicle from the departure place to the at least one destination.

17 Claims, 8 Drawing Sheets

*FIG. 6*

INFORMATION PROCESSING APPARATUS, CONTROL METHOD AND NON-TRANSITORY COMPUTER-READABLE MEDIUM

CROSS-REFERENCE TO RELATED APPLICATION

The present application claims priority to Japanese Patent Application No. 2019-141641 filed on Jul. 31, 2019, the entire disclosure of which is incorporated herein by reference.

TECHNICAL FIELD

The present disclosure relates to an information processing apparatus, a control method, and a program.

BACKGROUND

Conventionally, techniques for generating a travel plan for a vehicle in accordance with demand for vehicle dispatch are known. For example, JP 2003-288687 A (PTL 1) discloses a vehicle dispatch system which determines the situations of users from information on weather conditions and locations where people gather, and dispatches a vehicle.

CITATION LIST

Patent Literature

PTL 1: JP 2003-288687 A

SUMMARY

In recent years, it is desired to further improve the usability techniques for generating a travel plan for a vehicle. For example, it is desired to generate a travel plan for a vehicle which causes the vehicle to travel to a destination by automatically setting a destination even if a destination is not designated by a user.

An object of the present disclosure which has been made in view of such circumstances is to provide an information processing apparatus, a control method, and a program, which improve the usability of techniques for generating a travel plan for a vehicle.

An information processing apparatus according to one embodiment of the present disclosure includes a controller configured to, in a case in which information on a departure place is accepted, select at least one destination from one or more destination candidates and generate a travel plan for a vehicle from the departure place to the at least one destination.

A control method according to one embodiment of the present disclosure is a control method for an information processing apparatus.

In the control method, in a case in which information on a departure place is accepted, a controller selects at least one destination from one or more destination candidates and generates a travel plan for a vehicle from the departure place to the at least one destination.

A program according to one embodiment of the present disclosure causes an information processing apparatus to, in a case in which information on a departure place is accepted, select at least one destination from one or more destination candidates and generate a travel plan for a vehicle from the departure place to the at least one destination.

According to the information processing apparatus, the control method, and the program according to one embodiment of the present disclosure, the usability of techniques for generating a travel plan for a vehicle are improved.

DETAILED DESCRIPTION

One embodiment of the present disclosure will be described below.

In each of the drawings, the same reference numerals are assigned to the same or corresponding portions. In description of the present embodiment, description of the same or corresponding portions will be omitted or simplified as appropriate.

Information Processing System Configuration

Figure 1:
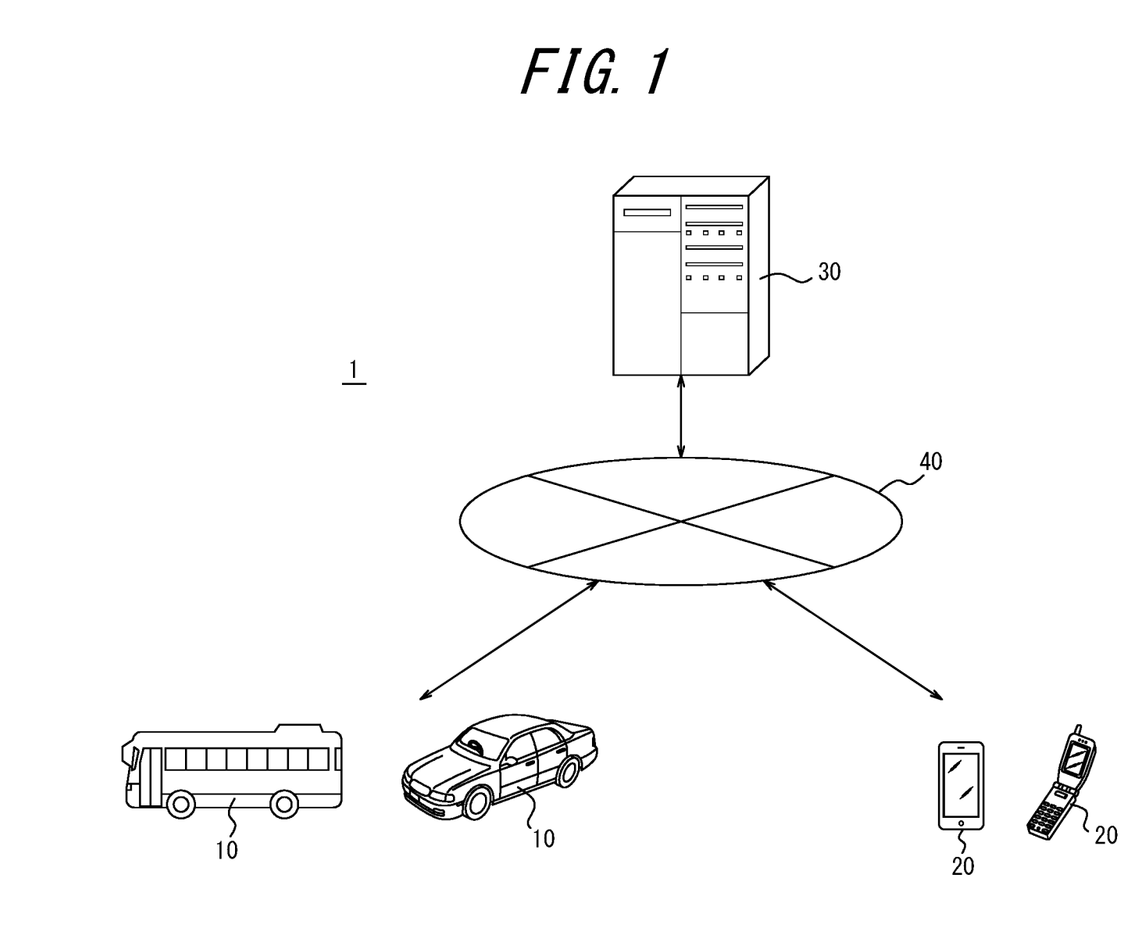
FIG. 1 is a diagram illustrating a schematic configuration of an information processing system according to one embodiment of the present disclosure.

An outline of an information processing system 1 according to one embodiment of the present disclosure will be described with reference to FIG. 1. The information processing system 1 includes a vehicle 10, a terminal apparatus 20 and a server 30. In FIG. 1, to simplify the description, two vehicles 10, two terminal apparatuses 20 and one server 30 are illustrated. However, the information processing system 1 may include any number of vehicles 10, any number of terminal apparatuses 20 and any number of servers 30.

The vehicle 10 is a vehicle which a user can board, such as, for example, an on-demand bus, a hired car, a shared car or a taxi. The vehicle 10 may be driven by a driver, or driving may be automated at any level. The level of automation is, for example, one of the levels from level 1 to level 5 as specified by the SAE (Society of Automotive Engineers).

The terminal apparatus 20 is an information processing apparatus such as, for example, a mobile phone, a smartphone or a personal computer. The server 30 includes one or a plurality of information processing apparatuses which can perform communication with each other. The vehicle 10, the terminal apparatus 20 and the server 30 can respectively perform communication with each other via a network 40.

The network 40 is any communication network through which the vehicle 10, the terminal apparatus 20 and the server 30 can perform communication with each other. The network 40 may be a wireless or a wired transmission path and may be a communication network such as the Internet. For example, the network 40 in the present embodiment may include an ad hoc network, a MAN (Metropolitan Area Network), a cellular network, a WPAN (Wireless Personal Area Network), a PSTN (Public Switched Telephone Network), a terrestrial wireless network, an optical network, other networks, or combination thereof.

In the information processing system 1, the server 30 registers one or more destination candidates in advance. The one or more destination candidates include facilities such as, for example, an event site, a restaurant, a store, a theme park, an art gallery, a museum and/or a park. In a case in which information on a departure place is accepted, the server 30 selects at least one destination from the one or more destination candidates and generates a travel plan for the vehicle 10 from the departure place to at least one destination. In the present embodiment, the "travel plan" for the vehicle 10 is a travel schedule for the vehicle 10. The travel plan for the vehicle 10 may include, for example, destination information indicating a position of at least one destination at which the vehicle 10 is to stop, a travel route which passes through the destination or which reaches the destination, an estimated time of departure from the departure place, an estimated time of arrival at the destination, or the like. For example, the vehicle 10 such as a bus travels from the departure place to the destination based on the travel plan to transport users from the departure place to the destination by receiving the travel plan from the server 30.

For example, in a case in which admission is restricted at a certain event site because there are too many visitors, the information processing system 1 is used to generate a travel plan for a bus which transports users who cannot take part in the event to other event sites. An administrator of the server 30 inputs the event site to the server 30 as the departure place. The server 30 selects a destination from the destination candidates to generate a travel plan for the bus such that users are transported from the event site to the destination. In this manner, the server 30 can automatically select a destination to generate a travel plan for the vehicle 10 so as to alleviate the concentration of people at a specific event site.

Next, the vehicle 10, the terminal apparatus 20 and the server 30 of the information processing system 1 will be described in detail.

Vehicle Configuration

A configuration of the vehicle 10 in the information processing system 1 will be described in detail. As illustrated in the block diagram in FIG. 2, the vehicle 10 includes a vehicle communication interface 11, a vehicle positioner 12, a vehicle memory 13, a vehicle output interface 14, a vehicle input interface 15 and a vehicle controller 16. The vehicle communication interface 11, the vehicle positioner 12, the vehicle memory 13, the vehicle output interface 14, the vehicle input interface 15, and the vehicle controller 16 may be respectively incorporated into the vehicle 10 or may be detachably provided to the vehicle 10. In a case in which they are detachably provided to the vehicle 10, each of the vehicle communication interface 11, the vehicle positioner 12, the vehicle memory 13, the vehicle output interface 14, the vehicle input interface 15, and the vehicle controller 16 may be provided in an information processing apparatuses such as a car navigation apparatus, which can be attached to and removed from the vehicle 10. The vehicle communication interface 11, the vehicle positioner 12, the vehicle memory 13, the vehicle output interface 14, the vehicle input interface 15 and the vehicle controller 16 are connected in a wired or a wireless manner so as to be able to perform communication via an in-vehicle network such as, for example, a CAN (Controller Area Network) or a leased line.

Figure 2:
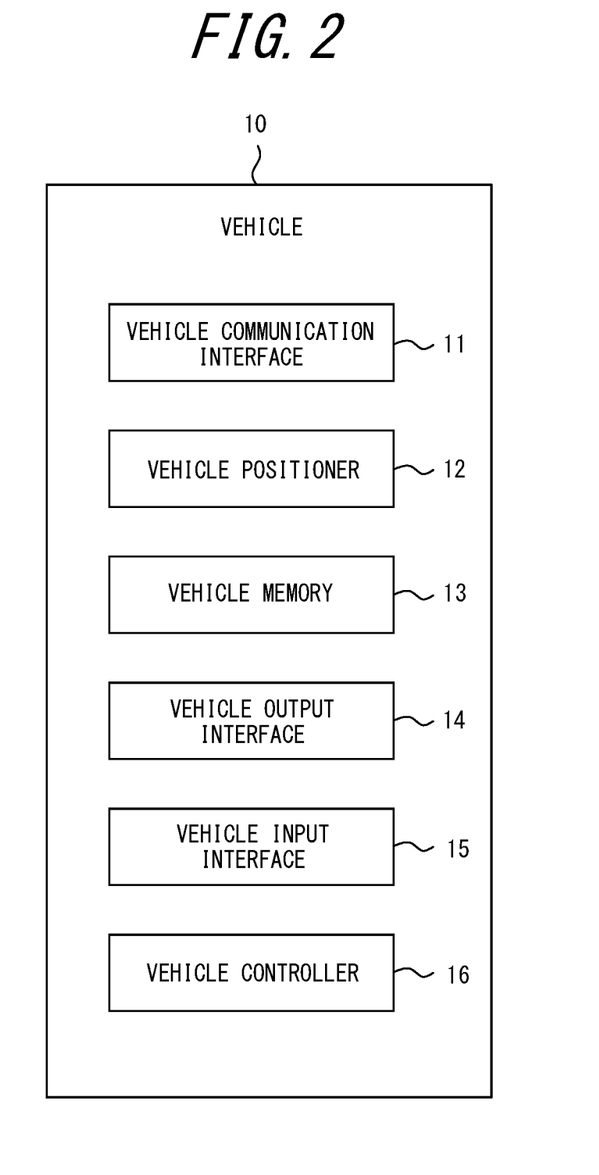
FIG. 2 is a block diagram illustrating a schematic configuration of a vehicle included in the information processing system.

The vehicle communication interface 11 includes a communication module to be connected to the network 40. The communication module is a communication module which supports mobile communication standards such as, for example, the 4G (4th Generation) and 5G (5th Generation) standards. The communication module may be a communication module which supports near field communication standards such as Wi-Fi (Wi-Fi is a registered trademark in Japan, other countries, or both), Bluetooth (Bluetooth is a registered trademark in Japan, other countries, or both) and infrared communication. For example, in-vehicle equipment may function as the vehicle communication interface 11. In the present embodiment, the vehicle 10 is connected to the network 40 via the vehicle communication interface 11. In this manner, the vehicle 10 can perform communication with the server 30, or the like.

The vehicle positioner 12 measures a position of the vehicle 10 and generates position information. In the present embodiment, the "position information" is information from which a position can be specified. In the present embodiment, the position information includes, for example, a coordinate such as a two-dimensional coordinate or a three-dimensional coordinate. However, the position information is not limited to a coordinate, and may include speed, a migration path, a moving distance, change amounts, change rates thereof, or the like. The vehicle positioner 12 includes a receiver which supports a satellite positioning system. The satellite positioning system supported by the receiver may be, for example, GPS (Global Positioning System). Alternatively, the vehicle positioner 12 may include an acceleration sensor, a gyro sensor, or the like. For example, a car navigation apparatus may function as the vehicle positioner 12.

The vehicle memory 13 is, for example, a semiconductor memory, a magnetic memory, an optical memory, or the like. The vehicle memory 13 functions as, for example, a main storage apparatus, an auxiliary storage apparatus or a cache memory. The vehicle memory 13 stores any information used for operation of the vehicle 10. For example, the vehicle memory 13 stores a system program, an application program, built-in software, or the like. The information stored in the vehicle memory 13 may be updated with, for example, information acquired from the network 40 via the vehicle communication interface 11.

The vehicle output interface 14 outputs information as images, sounds, or the like. The vehicle output interface 14 includes an output apparatus such as, for example, a display and/or a speaker. For example, a car navigation apparatus may function as the vehicle output interface 14. The vehicle output interface 14, for example, displays information such as a traveling route included in the travel plan for the vehicle 10 at the display.

The vehicle input interface 15 accepts an input operation. The vehicle input interface 15 includes an input apparatus such as, for example, a touch panel, a camera, a microphone, and/or an IC card reader.

The vehicle controller 16 includes one or more processors. The processor may be, for example, a general-purpose processor such as a CPU (Central Processing Unit), a dedicated processor which is dedicated to particular processing, or the like. The vehicle controller 16 may include one or more dedicated circuits as well as processors. The dedicated circuit may be, for example, an FPGA (Field-Programmable Gate Array) or an ASIC (Application Specific Integrated Circuit). The vehicle controller 16 respectively controls the vehicle communication interface 11, the vehicle positioner 12, the vehicle memory 13, the vehicle output interface 14 and the vehicle input interface 15 described above to realize functions thereof.

Figure 3:
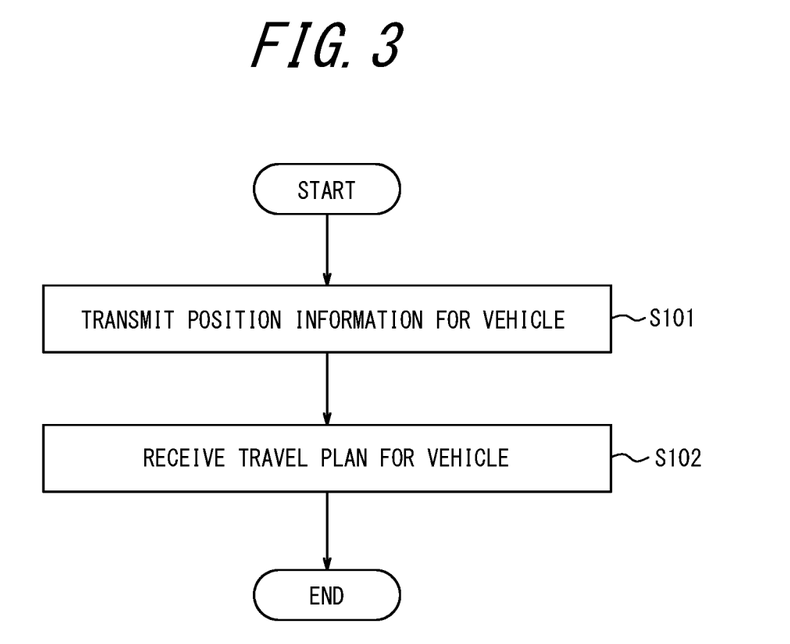
FIG. 3 is a flowchart illustrating processing of the vehicle included in the information processing system.

Operation of the vehicle 10 to be realized by each function of the vehicle 10 under the control of the vehicle controller 16 will be described with reference to FIG. 3. Operation of the vehicle 10 corresponds to a control method for the vehicle 10.

In step S101, the vehicle controller 16 transmits the position information for the vehicle 10.

Specifically, the vehicle controller 16 measures the position of the vehicle 10 using the vehicle positioner 12 to generate the position information. The vehicle controller 16 transmits the generated position information for the vehicle 10 to the server 30, or the like, from the vehicle communication interface 11.

In step S102, the vehicle controller 16 receives the travel plan for the vehicle 10 from the server 30.

Specifically, the vehicle controller 16 receives the travel plan for the vehicle 10 from the server 30 via the vehicle communication interface 11. The vehicle controller 16 may cause the received travel plan for the vehicle 10 to be stored in the vehicle memory 13. The vehicle controller 16, for example, causes information included in the travel plan for the vehicle 10 to be displayed on the display of the vehicle output interface 14. The vehicle controller 16 may cause the vehicle to travel using automated driving or supported driving by a driver, based on the travel plan for the vehicle 10.

Terminal Apparatus Configuration

A configuration of the terminal apparatus 20 in the information processing system 1 will be described in detail. As illustrated in a block diagram in FIG. 4, the terminal apparatus 20 includes a terminal communication interface 21, a terminal positioner 22, a terminal memory 23, a terminal output interface 24, a terminal input interface 25 and a terminal controller 26. The terminal communication interface 21, the terminal positioner 22, the terminal memory 23, the terminal output interface 24, the terminal input interface 25 and the terminal controller 26 are connected so as to be able to perform communication with each other in a wired or a wireless manner.

Figure 4:
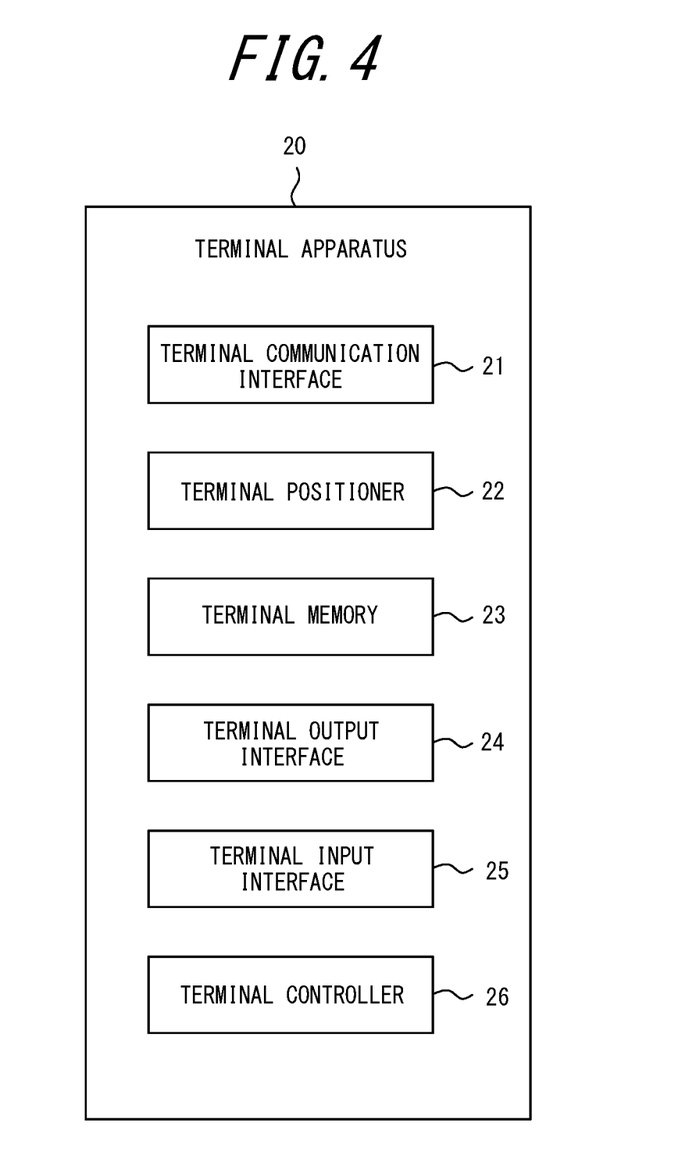
FIG. 4 is a block diagram illustrating a schematic configuration of a terminal apparatus included in the information processing system.

The terminal communication interface 21 includes a communication module to be connected to the network 40. The communication module may be a communication module which supports mobile communication standards such as, for example, the 4G and 5G standards. In the present embodiment, the terminal apparatus 20 is connected to the network 40 via the terminal communication interface 21. In this manner, the terminal apparatus 20 can perform communication with the server 30, or the like.

The terminal positioner 22 measures a position of the terminal apparatus 20 to generate position information. The terminal positioner 22 includes a receiver which supports a satellite positioning system. The satellite positioning system supported by the receiver may be GPS, for example.

The terminal memory 23 is, for example, a semiconductor memory, a magnetic memory, an optical memory, or the like. The terminal memory 23 may function as, for example, a main storage apparatus, an auxiliary storage apparatus or a cache memory. The terminal memory 23 stores any information used for operation of the terminal apparatus 20. For example, the terminal memory 23 stores a system program, an application program, built-in software, or the like. The information stored in the terminal memory 23 may be updated with, for example, information acquired from the network 40 via the terminal communication interface 21.

The terminal output interface 24 outputs information using images, sounds, or the like. The terminal output interface 24 includes a display apparatus such as, for example, a display, and a speaker. The terminal output interface 24, for example, displays at least part of boarding encouragement information on the display to encourage a user to board the vehicle 10.

The terminal input interface 25 accepts an input operation. The terminal input interface 25 includes an input apparatus such as, for example, a touch panel, a camera, a microphone, and/or an IC card reader. For example, the terminal input interface 25 may accept an input operation for a reservation to board the vehicle 10.

The terminal controller 26 includes one or more processors. The processor may be, for example, a general-purpose processor such as a CPU, a dedicated processor which is dedicated to particular processing, or the like. The vehicle controller 16 may include one or more dedicated circuits as well as processors. The dedicated circuit may be, for example, an FPGA or an ASIC. The terminal controller 26 respectively controls the terminal communication interface 21, the terminal positioner 22, the terminal memory 23, the terminal output interface 24 and the terminal input interface 25 described above to realize functions thereof.

Figure 5:
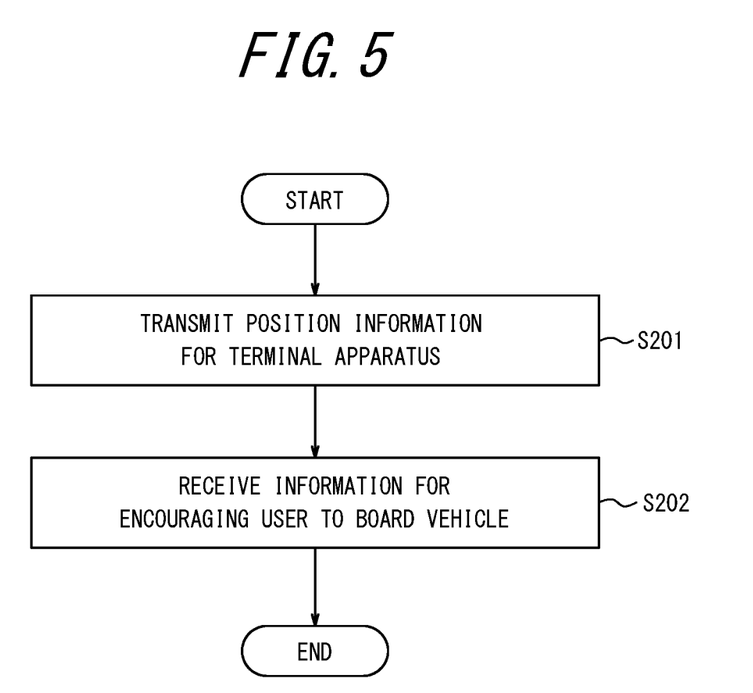
FIG. 5 is a flowchart illustrating processing of the terminal apparatus included in the information processing system.

Operation of the terminal apparatus 20 to be realized by each function of the terminal apparatus 20 under the control of the terminal controller 26 will be described with reference to FIG. 5. The operation of the terminal apparatus 20 corresponds to a control method for an information processing apparatus which can operate as the terminal apparatus 20.

In step S201, the terminal controller 26 transmits the position information for the terminal apparatus 20.

Specifically, the terminal controller 26 measures a position of the terminal apparatus 20 using the terminal positioner 22 to generate the position information. The terminal controller 26 transmits the generated position information for the terminal apparatus 20 to the server 30, or the like, from the terminal communication interface 21.

In step S202, the terminal controller 26 receives boarding encouragement information from the server 30 for encouraging a user to board the vehicle 10.

Specifically, the terminal controller 26 receives the boarding encouragement information for encouraging a user to board the vehicle 10 from the server 30 via the terminal communication interface 21 as will be described in detail later. The terminal controller 26 may store the received boarding encouragement information for encouraging a user to board the vehicle 10 in the terminal memory 23. The terminal controller 26 may, for example, cause at least part of the boarding encouragement information for encouraging a user to board the vehicle 10 to be displayed at the terminal output interface 24.

Server Configuration

Figure 6:
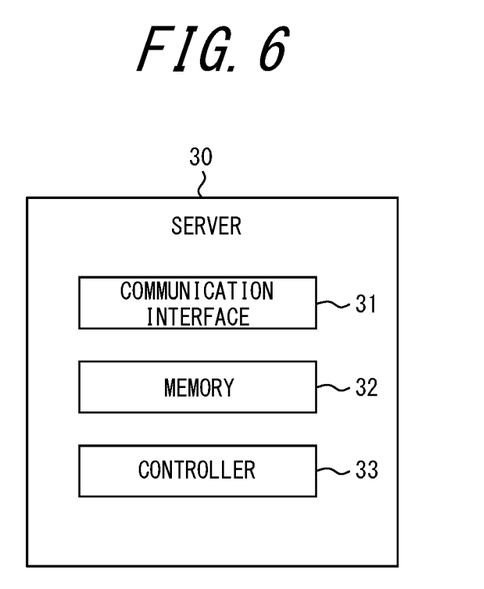
FIG. 6 is a block diagram illustrating a schematic configuration of a server included in the information processing system.

As illustrated in the block diagram in FIG. 6, the server 30 includes a communication interface 31, a memory 32 and a controller 33. The communication interface 31, the memory 32 and the controller 33 are connected so as to be able to perform communication with each other in a wired or a wireless manner.

The communication interface 31 includes a communication module to be connected to the network 40. The communication module may be a communication module which supports standards such as, for example, the wired LAN (Local Area Network) and wireless LAN standards. In the present embodiment, the server 30 is connected to the network 40 via the communication interface 31. In this manner, the server 30 can perform communication with the vehicle 10 and the terminal apparatus 20.

The memory 32 is, for example, a semiconductor memory, a magnetic memory, an optical memory, or the like. The memory 32 functions as, for example, a main storage apparatus, an auxiliary storage apparatus or a cache memory. The memory 32 stores any information used for operation of the server 30. For example, the memory 32 stores a system program, an application program, a database, or the like. The information stored in the memory 32 may updated with, for example, information acquired from the network 40 via the communication interface 31.

The controller 33 includes one or more processors. The processor may be, for example, a general-purpose processor such as a CPU, a dedicated processor which is dedicated to particular processing, or the like. The controller 33 may include one or more dedicated circuits as well as processors. The dedicated circuit may be, for example, an FPGA or an ASIC. The controller 33 respectively controls the communication interface 31 and the memory 32 described above to realizes functions thereof.

Figure 7:
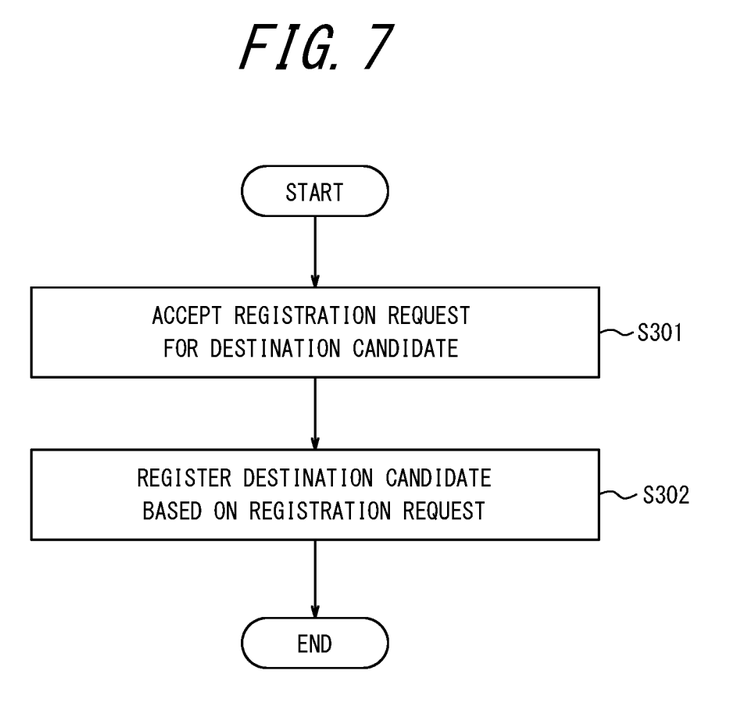
FIG. 7 is a flowchart illustrating an example of processing of the server included in the information processing system.
Figure 8:
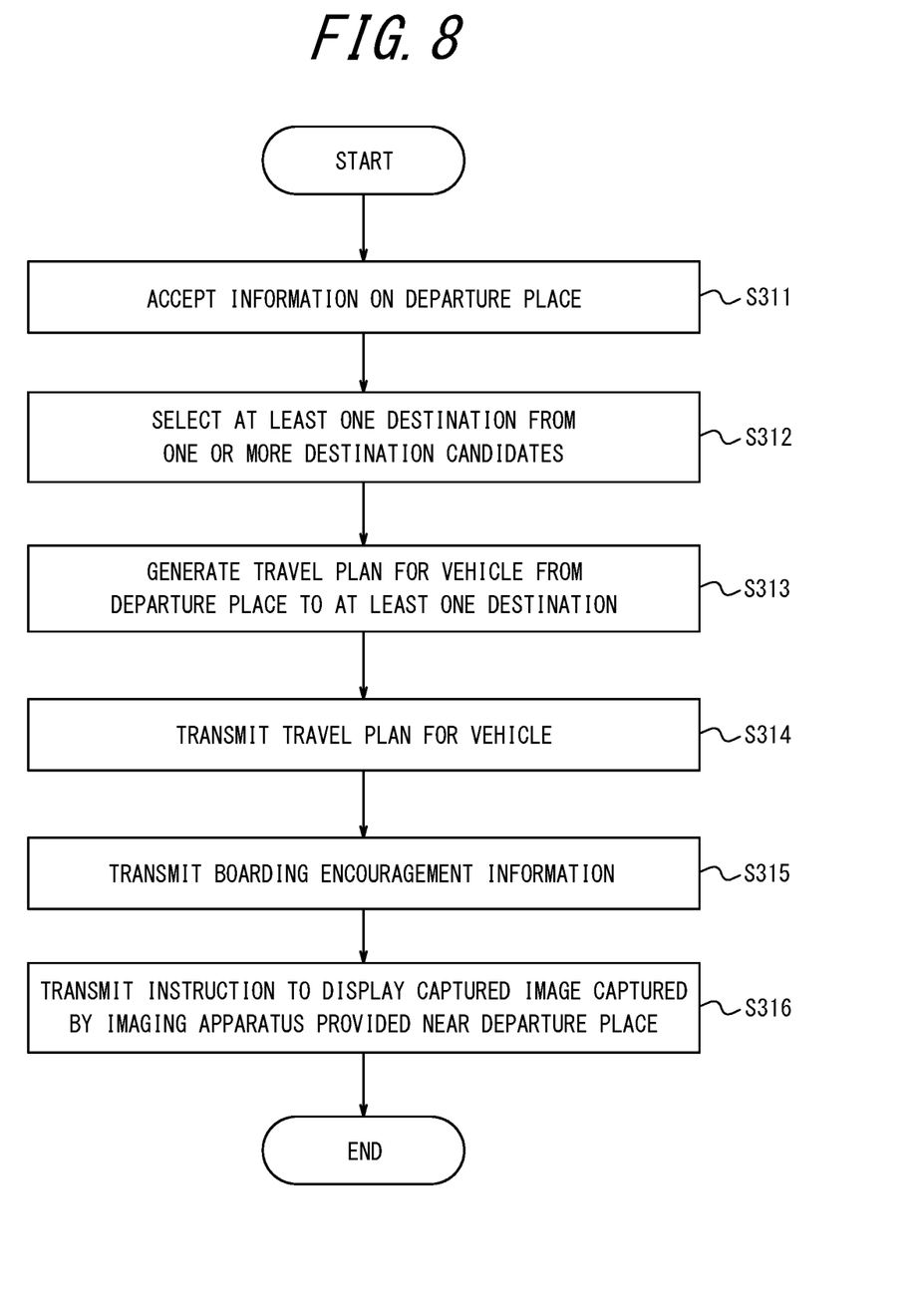
FIG. 8 is a flowchart illustrating another example of the processing of the server included in the information processing system.

Operation of the server 30 to be realized by each function of the server 30 under the control of the controller 33 will be described with reference to FIG. 7 and FIG. 8. The operation of the server 30 corresponds to a control method of an information processing apparatus which can operate as the server 30.

An operation relating to registration of one or more destination candidates will be described first with reference to FIG. 7.

In step S301, the controller 33 accepts a registration request for registering a new destination candidate.

Specifically, the controller 33 receives a registration request for registering a new destination candidate from another information processing apparatus connected to the network 40 via the communication interface 31. The controller 33 may accept a registration request for registering a new destination candidate from an input apparatus such as a keyboard via the communication interface 31. The controller 33 may cause the received registration request for registering a destination candidate to be stored in the memory 32.

In step S302, the controller 33 performs control to add a new destination candidate to one or more destination candidates based on the registration request for registering a new destination candidate.

Specifically, the controller 33 causes information on the new destination candidate included in the registration request to be stored in the memory 32. In a case in which one or more destination candidates have already been stored in the memory 32, the controller 33 adds the new destination candidate to the one or more destination candidates. Conversely, in a case in which one or more destination candidates are not stored in the memory 32, the controller 33 registers the new destination candidate as the one or more destination candidates. Information on the destination candidate includes position information for the destination candidate. The information on the destination candidate may include information such as an opening time of the destination candidate, service content to be provided at the destination candidate, and a degree of congestion at the destination candidate, and acquisition methods for this information, in addition to the position information for the destination candidate.

Operation regarding generation of the travel plan for the vehicle 10 will be described next with reference to FIG. 8.

The present operation will be described assuming that information on one or more destination candidates is stored in the memory 32 of the server 30.

In step S311, the controller 33 accepts information on the departure place.

Specifically, the controller 33 receives the information on the departure place from another information processing apparatus connected to the network 40 via the communication interface 31. The information on the departure place includes position information for the departure place. The controller 33 may accept the information on the departure place from an input apparatus such as a keyboard via the communication interface 31. Alternatively, the controller 33 may receive the position information for the vehicle 10 received from the vehicle 10 via the communication interface 31 as the information on the departure place. The controller 33 may cause the received information on the departure place to be stored in the memory 32. The information on the departure place may include a degree of congestion at the departure place, an estimated time of departure, information on an event to be held near the departure place, acquisition methods of these kinds of information, or the like, in addition to the position information for the departure place.

In step S312, in a case in which the information on the departure place is accepted, the controller 33 selects at least one destination from one or more destination candidates.

For example, the controller 33 selects at least one destination from one or more destination candidates based on information on a degree of congestion of one or more destination candidates. The "information on a degree of congestion" of one facility includes information such as, for example, the number of visitors at the facility, a rate of the number of visitors with respect to a total number of people who can enter the facility, and a waiting time until entering the facility. The information on the degree of congestion may include an actual measurement value or may include a predicted value. Specifically, the controller 33 acquires degrees of congestion for destination candidates from an external information provision service, or the like, via the communication interface 31 in accordance with an acquisition method for the degrees of congestion of destination candidates included in the information on the destination candidates. The controller 33 may store the acquired degrees of congestion for the destination candidates in the memory 32. The controller 33 compares the acquired information on the degrees of congestion for the destination candidates and selects at least one destination from the one or more destination candidates. The controller 33, for example, compares the acquired degrees of congestion for the destination candidates and selects one destination from the one or more destination candidates in favor of a destination candidate with a lower degree of congestion. The controller 33 can level the degrees of congestion among the destination candidates by generating the travel plan for the vehicle 10 such that users are transported to a destination candidate with a lower degree of congestion.

The controller 33 acquires the degree of congestion of the departure place from the external information provision service, or the like, via the communication interface 31 based on the information on the departure place. The controller 33 may store the acquired degree of congestion of the departure place in the memory 32. The controller 33 compares the degree of congestion of the departure place with the degrees of congestion of one or more destination candidates and selects at least one destination from the one or more destination candidates in favor of a destination candidate with a lower degree of congestion than the degree of congestion of the departure place. In this manner, it is possible to prevent a degree of satisfaction of the user from reducing due to the destination being crowded in a similar manner to the departure place even though the user of the vehicle 10 boarded the vehicle 10 to move to the destination because the departure place was crowded.

Further, the controller 33 selects at least one destination from one or more destination candidates based on information regarding an event which is to be held near the departure place. The controller 33 may select an event site at which an event relating to the event to be held near the departure place is to be held as the destination from one or more destination candidates. For example, in a case in which the event to be held near the departure place is a sports game, the controller 33 may select a site at which another sports game is held as the destination. Alternatively, in a case in which the event to be held near the departure place is a concert of a singer, the controller 33 may select a store at which goods of the singer can be purchased as the destination. In this manner, the controller 33 can motivate the user of the vehicle 10 to board the vehicle 10 instead of entering the event site.

In step S313, the controller 33 generates the travel plan for the vehicle 10 from the departure place to at least one destination.

Specifically, the controller 33 generates the travel plan for the vehicle 10 based on the information on the departure place and information on at least one destination selected as described above. The travel plan for the vehicle 10 may include, for example, the position information for the departure place, an estimated time of departure, position information for at least one destination, a travel route which passes through the destination or which reaches the destination, an estimated time of arrival at the destination, or the like. The travel plan for the vehicle 10 is a travel plan from the departure place to at least one destination. However, the travel plan for the vehicle 10 may be a travel plan in which the vehicle departs from the departure place, passes through at least one destination, and returns to the departure place. The controller 33 may store the generated travel plan in the memory 32.

In step S314, the controller 33 transmits the travel plan for the vehicle 10.

Specifically, the controller 33 transmits the travel plan for the vehicle 10 to the vehicle 10 via the communication interface 31. In this manner, the vehicle 10 which receives the travel plan can display information included in the travel plan on the display of the vehicle output interface 14 and can travel automatically or manually based on the travel plan.

In step S315, the controller 33 transmits boarding encouragement information which encourages the user to board the vehicle 10. Hereinafter, the boarding encouragement information which encourages the user to board the vehicle 10 will be also simply be referred to as boarding encouragement information for the vehicle 10.

Specifically, the controller 33 transmits the boarding encouragement information for the vehicle 10 to the terminal apparatus 20 via the communication interface 31. In this manner, the terminal apparatus 20 which receives the boarding encouragement information for the vehicle 10 can display information included in the boarding encouragement information for the vehicle 10 on the display of the terminal output interface 24.

The boarding encouragement information for the vehicle 10 includes information which notifies the user of only the departure place from among the departure place and the at least one destination. The information for notifying the user of the departure place includes, for example, a name, position information, or the like, of the departure place. The information for notifying the user of the destination includes a name, position information, or the like, of the destination. In this manner, by not notifying the user of the terminal apparatus 20 of the destination, it is possible to enhance interest in boarding the vehicle 10. The information for encouraging the user to board the vehicle 10 may include at least one of an estimated time of departure from the departure place, an estimated time of arrival at the destination, a cost, a capacity of the vehicle, the travel route, a service to be provided within the vehicle, or the like, in addition to the information which notifies the user of the departure place. Conversely, the information for encouraging the user to board the vehicle 10 may include information for notifying the user of the destination.

Further, the controller 33 can transmit the boarding encouragement information for the vehicle 10 only to the terminal apparatus 20 which is a transmission target, based on predetermined conditions. Specifically, the controller 33 may transmit the boarding encouragement information to the terminal apparatus 20 located near the departure place based on the position information for the terminal apparatus 20 received from the terminal apparatus 20. Alternatively, based on information on the terminal apparatuses 20 possessed by the users who are to take part in or who apply for taking part in the event to be held near the departure place, received from the external information provision service, or the like, the controller 33 may transmit boarding encouragement information to the terminal apparatuses 20 possessed by these users. In this manner, the controller 33 can efficiently collect the users of the vehicle 10.

In step S316, the controller 33 transmits an instruction to display a captured image of an event which is held near the departure place.

Specifically, the controller 33 receives the captured image of the event which is held near the departure place from another information processing apparatus via the communication interface 31. The captured image of the event which is held near the departure place is, for example, an image captured by an imaging apparatus such as a camera provided at the event site of the event held near the departure place. The controller 33 transmits an instruction to display the captured image including the received captured image to the vehicle 10 from the communication interface 31. The vehicle 10 which has received the instruction to display the captured image can display the captured image on the display of the vehicle output interface 14. In this manner, it is possible to allow the user who boards the vehicle 10 without taking part in the event to view the captured image of the event site, so that it is possible to increase a degree of satisfaction of the user by utilizing the vehicle 10.

Conversely, the controller 33 does not have to receive the captured image of the event. The controller 33 may transmit the instruction to display the captured image including acquisition information such as an acquisition source for the captured image of the event held near the departure place to the vehicle 10 from the communication interface 31. The vehicle 10 which has received the instruction to display the captured image can acquire the captured image itself in accordance with the acquisition information and display the captured image on the display of the vehicle output interface 14. In this manner, the server 30 does not have to perform processing of the captured image, so that it is possible to suppress information processing capacity, memory capacity, or the like, required for the server 30.

As described above, the information processing apparatus, which is the server 30 according to the present embodiment, includes the controller 33. In a case in which the information on the departure place is accepted, the controller 33 selects at least one destination from one or more destination candidates and generates a travel plan for the vehicle 10 from the departure place to the at least one destination. According to such a configuration, by virtue of one or more destination candidates being registered in advance, even if the destination is not designated via user input, or the like, the information processing apparatus can select at least one destination from one or more destination candidates and generate the travel plan for the vehicle 10 from the departure place. Therefore, the information processing apparatus can improve the usability of techniques for generating travel plans for a vehicle.

According to the information processing apparatus, which is the server 30 of the present embodiment, the controller 33 can select at least one destination from one or more destination candidates based on information on degrees of congestion for one or more destination candidates. According to such a configuration, the information processing apparatus can set the destination while taking into account the degrees of congestion for the destination candidates, so that it is possible to improve usability of techniques for generating travel plans for a vehicle.

According to the information processing apparatus, which is the server 30 of the present embodiment, the controller 33 can select a destination candidate with a lower degree of congestion as the at least one destination from the one or more destination candidates. According to such a configuration, the information processing apparatus can level the degrees of congestion among the destination candidates by generating a travel plan for the vehicle 10 such that users are transported to a destination candidate with a lower degree of congestion.

According to the information processing apparatus, which is the server 30 of the present embodiment, the controller 33 can select a destination candidate with a lower degree of congestion than the degree of congestion of the departure place as at least one destination from one or more destination candidates. According to such as configuration, the information processing apparatus can encourage a user who desires to move to a location where a degree of congestion is lower than that of a departure point to board the vehicle 10.

According to the information processing apparatus, which is the server 30 of the present embodiment, the controller 33 can select at least one destination from one or more destination candidates based on information regarding an event to be held near the departure place. According to such a configuration, the information processing apparatus can motivate the user of the vehicle 10 to board the vehicle 10 instead of entering the event site.

According to the information processing apparatus, which is the server 30 of the present embodiment, the controller 33 can transmit boarding encouragement information for encouraging the user to board the vehicle 10 including information which notifies the user of only the departure place from among the departure place and the at least one destination. According to such a configuration, the information processing apparatus can enhance interest in boarding the vehicle 10 by not notifying the user of the vehicle 10 of the destination.

According to the information processing apparatus, which is the server 30 of the present embodiment, the controller 33 can transmit boarding encouragement information to information processing apparatuses located near the departure place. According to such a configuration, the information processing apparatus can efficiently collect users of the vehicle 10.

According to the information processing apparatus, which is the server 30 of the present embodiment, the controller 33 can transmit an instruction to display a captured image of an event held near the departure place. According to such a configuration, the information processing apparatus can cause the vehicle 10 to display the captured image of the event, and can allow a user who boards the vehicle 10 without taking part in the event to view the captured image of the event site, so that it is possible to improve the degree of satisfaction of the user of the vehicle 10.

According to the information processing apparatus, which is the server 30 of the present embodiment, the controller 33 can accept a registration request for registering a new destination candidate and add the new destination candidate to one or more destination candidates based on the registration request. According to such a configuration, the information processing apparatus can register and add a destination candidate included in one or more destination candidates, so that it is possible to further improve the usability of techniques for generating a travel plan for the vehicle 10.

The information processing system 1 according to the present embodiment includes the information processing apparatus, which is the server 30 of the present embodiment, and the vehicle 10. The information processing apparatus transmits a travel plan to the vehicle 10. According to such a configuration, by virtue one or more destination candidates being registered in advance, even if the destination is not designated via user input, or the like, the information processing apparatus can select at least one destination from one or more destination candidates and generate a travel plan for the vehicle 10. Further, the vehicle 10 can travel from the departure place to at least one destination in accordance with the received travel plan. Therefore, the information processing system 1 can improve usability of techniques for generating a travel plan for the vehicle 10.

A control method according to the present embodiment is a control method for an information processing apparatus, such as the server 30. In the control method, in a case in which information on the departure place is accepted, the controller 33 selects at least one destination from one or more destination candidates and generates a travel plan for the vehicle 10 from the departure place to the at least one destination. According to such a configuration, by virtue of one or more destination candidates being registered in advance, even if the destination is not designated though user input, or the like, the information processing apparatus can select at least one destination from one or more destination candidates and generate a travel plan for the vehicle 10. Therefore, the information processing apparatus can improve usability of techniques for generating a travel plan for the vehicle 10.

In the control method according to the present embodiment, the controller 33 can select at least one destination from one or more destination candidates based on information on degrees of congestion of one or more destination candidates. According to such a configuration, the information processing apparatus can set the destination while taking into account the degrees of congestion of the destination candidates, so that it is possible to further improve usability of techniques for generating a travel plan for a vehicle.

In the control method according to the present embodiment, the controller 33 can select at least one destination from one or more destination candidates based on information regarding an event to be held near the departure place. According to such a configuration, the information processing apparatus can motivate the user of the vehicle 10 to board the vehicle 10 instead of entering the event site.

In the control method according to the present embodiment, the controller 33 can transmit boarding encouragement information for encouraging the user to board the vehicle 10 including information which notifies the user of only the departure place from among the departure place and the destination. According to such a configuration, the information processing apparatus can enhance interest in boarding the vehicle 10 by not notifying the user of the vehicle 10 of the destination.

In the control method according to the present embodiment, the controller 33 can transmit an instruction to display a captured image of an event held near the departure place. According to such a configuration, the information processing apparatus can cause the vehicle 10 to display the captured image of the event and can allow the user who boards the vehicle 10 without taking part in the event to view the captured image of the event site, so that it is possible to improve a degree of satisfaction of the user of the vehicle 10.

A program according to the present embodiment causes the information processing apparatus, such as the server 30, to, in a case in which information on the departure place is accepted, select at least one destination from one or more destination candidates and generate a travel plan for the vehicle 10 from the departure place to the at least one destination. According to such a configuration, by virtue of one or more destination candidates being registered in advance, even if the destination is not designated via user input, or the like, the information processing apparatus can select at least one destination from one or more destination candidates and generate a travel plan for the vehicle 10. Therefore, the information processing apparatus can improve usability of techniques for generating a travel plan for the vehicle 10.

In the program according to the present embodiment, it is possible to cause the information processing apparatus to select at least one destination from one or more destination candidates based on degrees of congestion of one or more destination candidates. According to such a configuration, the information processing apparatus can set the destination while taking into account the degrees of congestion of the destination candidates, so that it is possible to further improve usability of techniques for generating a travel plan for a vehicle.

In the program according to the present embodiment, it is possible to cause the information processing apparatus to select at least one destination from one or more destination candidates based on information regarding an event to be held near the departure place. According to such a configuration, the information processing apparatus can motivate the user of the vehicle 10 to board the vehicle 10 instead of entering the event site.

In the program according to the present embodiment, it is possible to cause the information processing apparatus to transmit boarding encouragement information for encouraging the user to board the vehicle 10, including information which notifies the user of only the departure place from among the departure place and the destination. According to such a configuration, the information processing apparatus can enhance interest in boarding the vehicle 10 by not notifying the user of the vehicle 10 of the destination.

In the program according to the present embodiment, it is possible to cause the information processing apparatus to transmit an instruction to display a captured image of an event held near the departure place. According to such a configuration, the information processing apparatus can cause the vehicle 10 to display the captured image of the event, and can allow the user who boards the vehicle 10 without taking part in the event to view the captured image of the event site, so that it is possible to improve a degree of satisfaction of the user of the vehicle 10.

While the present disclosure has been described based on the drawings and examples, it is to be noted that a person skilled in the art can easily make various modifications and revisions based on the present disclosure. It is to be, therefore, noted that these modifications and revisions are included in the scope of the present disclosure. For example, it is possible to rearrange functions, or the like, included in the respective means, the respective steps, or the like, without producing logical inconsistency, and it is possible to combine a plurality of means, steps, or the like, to make one means, step, or the like, or divide the means, steps, or the like.

For example, in the above-described embodiment, all or some of functions or processing described as the functions or the processing of the server 30 may be realized as functions or processing of the vehicle 10 or the terminal apparatus 20. Specifically, it is also possible to store a program which describes processing content for realizing respective functions of the server 30 according to the embodiment in the vehicle memory 13 such as a memory of the vehicle 10 and cause the vehicle controller 16 such as a processor of the vehicle 10 to read out and execute the program. In a similar manner, it is also possible to store a program which describes processing content for realizing respective functions of the server 30 according to the embodiment in the terminal memory 23 such as a memory of the terminal apparatus 20 and cause the terminal controller 26 such as a processor of the terminal apparatus 20 to read out and execute the program.

For example, it is also possible to employ a configuration in which a general-purpose information processing apparatus such as a smartphone or a computer is caused to function as the vehicle 10, the terminal apparatus 20 or the server 30 according to the above-described embodiment. Specifically, a program which describes processing content for realizing respective functions of the vehicle 10, the terminal apparatus 20 or the server 30 according to the embodiment is stored in a memory of electronic equipment, and the program is read out and executed by a processor of the electronic equipment. Therefore, the invention according to the present embodiment can be realized as a program which can be executed by a processor. For example, in a case in which a general-purpose information processing apparatus is caused to function as the vehicle 10, the invention according to the present embodiment can be realized by providing an information processing apparatus having the above-described configuration and functions as the configuration and the functions of the vehicle 10, at the vehicle 10.

The invention claimed is:

1. An information processing apparatus comprising:
a controller configured to, in a case in which information on a departure place is accepted, select at least one destination from one or more destination candidates and generate a travel plan for a vehicle from the departure place to the at least one destination,
wherein the controller transmits boarding encouragement information for encouraging a user to board the vehicle, including information which notifies the user of only the departure place from among the departure place and the at least one destination.

2. The information processing apparatus according to claim 1,
wherein the controller selects the at least one destination from the one or more destination candidates based on information on a degree of congestion of the one or more destination candidates.

3. The information processing apparatus according to claim 2,
wherein the controller selects a destination candidate with a low degree of congestion as the at least one destination from the one or more destination candidates.

4. The information processing apparatus according to claim 2,
wherein the controller selects a destination candidate with a lower degree of congestion than a degree of congestion of the departure place as the at least one destination from the one or more destination candidates.

5. The information processing apparatus according to claim 1,
wherein the controller selects the at least one destination from the one or more destination candidates based on information regarding an event to be held near the departure place.

6. The information processing apparatus according to claim 1,
wherein the controller transmits the boarding encouragement information to an information processing apparatus located near the departure place.

7. The information processing apparatus according to claim 1,
wherein the controller transmits an instruction to display a captured image of an event held near the departure place.

8. The information processing apparatus according to claim 1,
wherein the controller accepts a registration request for registering a new destination candidate and adds the new destination candidate to the one or more destination candidates based on the registration request.

9. An information processing system comprising the information processing apparatus according to claim 1 and the vehicle,
wherein the information processing apparatus transmits the travel plan to the vehicle.

10. A control method of an information processing apparatus, comprising:
in a case in which information on a departure place is accepted, a controller selecting at least one destination from one or more destination candidates and generating a travel plan for a vehicle from the departure place to the at least one destination,
wherein the controller transmits boarding encouragement information for encouraging a user to board the vehicle, including information which notifies the user of only the departure place from among the departure place and the destination.

11. The control method according to claim 10,
wherein the controller selects the at least one destination from the one or more destination candidates based on information on degrees of congestion of the one or more destination candidates.

12. The control method according to claim 10,
wherein the controller selects the at least one destination from the one or more destination candidates based on information regarding an event to be held near the departure place.

13. The control method according to claim 10,
wherein the controller transmits an instruction to display a captured image of an event held near the departure place.

14. A non-transitory computer-readable medium storing a program for causing an information processing apparatus to, in a case in which information on a departure place is accepted, select at least one destination from one or more destination candidates and generate a travel plan for a vehicle from the departure place to the at least one destination,
wherein the information processing apparatus is caused to transmit boarding encouragement information for encouraging a user to board the vehicle, including information which notifies the user of only the departure place from among the departure place and the destination.

15. The non-transitory computer-readable medium according to claim 14, wherein the information processing apparatus is caused to select the at least one destination from the one or more destination candidates based on information on degrees of congestion of the one or more destination candidates.

16. The non-transitory computer-readable medium according to claim 14, wherein the information processing apparatus is caused to select the at least one destination from the one or more destination candidates based on information regarding an event to be held near the departure place.

17. The non-transitory computer-readable medium according to claim 14, wherein the information processing apparatus is caused to transmit an instruction to display a captured image of an event held near the departure place.

* * * * *